United States Patent
Yamaya et al.

(10) Patent No.: US 10,074,853 B2
(45) Date of Patent: Sep. 11, 2018

(54) ELECTRODE MATERIAL FOR LITHIUM-ION RECHARGEABLE BATTERY, ELECTRODE FOR LITHIUM-ION RECHARGEABLE BATTERY, AND LITHIUM-ION RECHARGEABLE BATTERY

(71) Applicant: Sumitomo Osaka Cement Co., Ltd., Tokyo (JP)

(72) Inventors: Ryuuta Yamaya, Tokyo (JP); Satoru Oshitari, Tokyo (JP); Masataka Oyama, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 92 days.

(21) Appl. No.: 15/075,790

(22) Filed: Mar. 21, 2016

(65) Prior Publication Data
US 2017/0092941 A1   Mar. 30, 2017

(30) Foreign Application Priority Data

Sep. 30, 2015 (JP) ................................ 2015-192992

(51) Int. Cl.
| | |
|---|---|
| H01M 4/36 | (2006.01) |
| H01M 4/583 | (2010.01) |
| H01M 2/16 | (2006.01) |
| H01M 4/136 | (2010.01) |
| H01M 4/38 | (2006.01) |
| H01M 4/58 | (2010.01) |
| H01M 4/62 | (2006.01) |
| H01M 4/66 | (2006.01) |
| H01M 10/0525 | (2010.01) |
| H01M 10/0568 | (2010.01) |
| H01M 10/0569 | (2010.01) |
| H01M 4/04 | (2006.01) |
| H01M 4/1397 | (2010.01) |
| H01M 4/02 | (2006.01) |

(52) U.S. Cl.
CPC ........... *H01M 4/366* (2013.01); *H01M 2/162* (2013.01); *H01M 2/1653* (2013.01); *H01M 4/136* (2013.01); *H01M 4/382* (2013.01); *H01M 4/583* (2013.01); *H01M 4/5825* (2013.01); *H01M 4/623* (2013.01); *H01M 4/625* (2013.01); *H01M 4/661* (2013.01); *H01M 10/0525* (2013.01); *H01M 10/0568* (2013.01); *H01M 10/0569* (2013.01); *H01M 4/043* (2013.01); *H01M 4/0404* (2013.01); *H01M 4/0471* (2013.01); *H01M 4/1397* (2013.01); *H01M 2004/021* (2013.01); *H01M 2004/027* (2013.01); *H01M 2004/028* (2013.01); *H01M 2220/20* (2013.01); *H01M 2220/30* (2013.01); *H01M 2300/0037* (2013.01)

(58) Field of Classification Search
CPC .... H01M 4/366; H01M 4/5825; H01M 4/583; H01M 4/136; H01M 4/625; H01M 4/623; H01M 4/661; H01M 4/382
See application file for complete search history.

(56) References Cited

U.S. PATENT DOCUMENTS

| 4,960,657 A | * | 10/1990 | Masuda | .................. | H01M 4/13 429/213 |
|---|---|---|---|---|---|
| 2011/0189550 A1 | * | 8/2011 | Zhao | ................. | H01M 10/0567 429/338 |
| 2013/0224595 A1 | * | 8/2013 | Nuspl | ................. | H01M 4/5825 429/220 |
| 2015/0194675 A1 | | 7/2015 | Mine et al. | | |

FOREIGN PATENT DOCUMENTS

| JP | 2003-292308 A | 10/2003 |
|---|---|---|
| JP | 2003-292309 A | 10/2003 |
| JP | 2006-032241 A | 2/2006 |

(Continued)

OTHER PUBLICATIONS

R. Mei et al., Triple carbon coated LiFePO4 composite with hierarchical conductive architecture as high-performance cathode for Li-ion batteries, Electrochemica Acta 153:523-530 (2015).

Notice of Allowance for Japanese Application No. 2015-192992 (dated Dec. 20, 2016).

Office Action for Japanese patent application 2015-192992 from Japanese Patent Office dated Feb. 2, 2016.

Sun et al., "The Optimum Nanomicro Structure of LiFe $PO_4$/Ortho-Rich Polyacene Composites," *J. Phys. Chem. C*, 114:3297-3303 (2010).

Office Action for Japanese Patent Application No. 2015-192992 (dated Aug. 23, 2016).

*Primary Examiner* — Osei K Amponsah
(74) *Attorney, Agent, or Firm* — Merchant & Gould P.C.

(57) ABSTRACT

[Problems] To provide an electrode material for a lithium-ion rechargeable battery capable of improving the battery characteristics, durability, and stability of a lithium-ion rechargeable battery, an electrode for a lithium-ion rechargeable battery, and a lithium-ion rechargeable battery.

[Means] An electrode material for a lithium-ion rechargeable battery of the present invention is an electrode material for a lithium-ion rechargeable battery formed by coating the surface of an electrode active material represented by General Formula $Li_xA_yD_zPO_4$ (here, A represents at least one element selected from Co, Mn, Ni, Fe, Cu, and Cr, D represents at least one element selected from Mg, Ca, Sr, Ba, Ti, Zn, B, Al, Ga, In, Si, Ge, Sc, and Y, $1 \le x \le 1.1$, $0 < y \le 1$, $0 \le z < 1$, $0.9 < y+z \le 1$) with a carbonaceous film, in which a saturated adsorbed moisture amount in a carbonaceous film single body, which is detected in a temperature range of room temperature or more and 250° C. or less by means of Karl Fischer (coulometric titration), is 5000 ppm or more and 50000 ppm or less.

15 Claims, No Drawings

(56) References Cited

FOREIGN PATENT DOCUMENTS

| | | |
|---|---|---|
| JP | 2007-134274 A | 5/2007 |
| JP | 2010-508234 A | 3/2010 |
| JP | 2011-216272 A | 10/2011 |
| JP | 5528564 B2 | 6/2014 |
| JP | 2014-201459 A | 10/2014 |
| JP | 5820521 B | 11/2015 |
| JP | 5836461 B | 12/2015 |
| WO | WO 2015/064192 A1 | 5/2015 |

* cited by examiner

ELECTRODE MATERIAL FOR LITHIUM-ION RECHARGEABLE BATTERY, ELECTRODE FOR LITHIUM-ION RECHARGEABLE BATTERY, AND LITHIUM-ION RECHARGEABLE BATTERY

CROSS-REFERENCE TO RELATED APPLICATIONS

This application claims the benefit of Japanese Patent Application No. 2015-192992 filed Sep. 30, 2015, the disclosure of which is herein incorporated by reference in its entirety.

TECHNICAL FIELD

The present invention relates to an electrode material for a lithium-ion rechargeable battery, an electrode for a lithium-ion rechargeable battery, and a lithium-ion rechargeable battery.

BACKGROUND ART

Recently, in response to distribution of mobile electronic devices such as a mobile phone and a mobile computer, a battery such as a lithium-ion rechargeable battery having a high energy density is being widely distributed as a power supply for mobile electronic devices. In addition, a lithium-ion rechargeable battery is applied to a variety of kinds of use such as an electric power tool, a domestic backup power supply, and an electric vehicle including a small-sized electronic device as well. Accordingly, for a lithium-ion rechargeable battery, there is a strong demand for an additional decrease in size and weight, higher stability, and a longer service life.

A lithium-ion rechargeable battery includes a cathode, an anode, an electrolytic solution, and a separator. As an electrode material constituting the cathode, a lithium-containing metallic oxide having properties capable of reversibly intercalating and deintercalating lithium ions such as lithium cobalt oxide ($LiCoO_2$), lithium manganese oxide ($LiMn_2O_4$), or lithium iron phosphate ($LiFePO_4$) is used.

As a charge and discharge reaction of a rechargeable battery proceeds, the internal resistance increases due to electric decomposition of water in the battery or decomposition of an electrolytic solution or the durability or the stability degrades due to generation of gas, and thus the battery characteristics deteriorate. In addition, there is another concern that an electrode material may be dissolved due to hydrofluoric acid generated from a reaction between water and an electrolyte or metal ions eluted in the electrolytic solution may precipitate on the surface of the anode and thus the durability may degrade.

In order to improve the durability or the stability, it is essential to reduce the amount of moisture in the battery. A number of studies are made regarding additives that are added to an electrolytic solution in order to trap moisture, metallic ions, and hydrofluoric acid in the battery. However, there is a concern that battery characteristics may be degraded since a protective film derived from the additives is formed on the surface of an electrode material and thus reaction resistance is increased due to the protective film (for example, refer to Patent Document 1). In order to suppress the above-described disadvantage of the battery, it is necessary to closely investigate additives and decrease the amount of moisture in the electrode material or suppress adsorption of moisture to the electrode material.

PRIOR ART REFERENCES

Patent Document

[Patent Document 1] Japanese Patent No. 5,528,564

SUMMARY OF THE INVENTION

Problems to be Solved

Examples of moisture in the electrode material include surface-adsorbed water, structured water derived from impurities, water in micropores in a carbon layer, and the like.

Since $LiMPO_4$ (M represents a metallic element) has insufficient Li ions and insufficient electron conductivity, in order to improve the battery characteristics of a battery in which $LiMPO_4$ is used, it is necessary to increase the specific surface area of $LiMPO_4$ particles and to coat the surfaces of the $LiMPO_4$ particles with a conductive carbon layer. However, since $LiMPO_4$ particles have a large specific surface area, moisture is easily adsorbed thereto, and furthermore, some of the moisture intrudes into micropores in a carbon layer, and thus it becomes difficult to remove the moisture in the micropores. When the specific surface area of the $LiMPO_4$ particles is decreased, it is possible to reduce the amount of the adsorbed moisture, but a small specific surface area of the $LiMPO_4$ particles makes it difficult to provide sufficient battery characteristics to a battery in which $LiMPO_4$ is used.

In addition, studies are also made to reduce the amount of the adsorbed moisture by coating the surface of the carbon layer with a silane coupling agent or the like so as to make the surface hydrophilic. However, when the surface of the carbon layer is coated with a silane coupling agent or the like, the electron conductivity of the electrode material degrades or an intercalating and deintercalating reaction of Li ions is hindered, and thus the battery characteristics degrade.

As described above, in the electrode material, it is an object to satisfy both battery characteristics being improved by adjusting the specific surface area to be in an optimal range and adjusting the carbon coating amount to be in an optimal range and durability and stability being improved by reducing the amount of moisture in the carbon layer.

The present invention has been made in consideration of the above-described circumstances, and an object of the present invention is to provide an electrode material for a lithium-ion rechargeable battery capable of improving the battery characteristics, durability, and stability of a lithium-ion rechargeable battery, an electrode for a lithium-ion rechargeable battery, and a lithium-ion rechargeable battery.

Means for Solving the Problems

The present inventors and the like carried out intensive studies in order to solve the above-described problem, and consequently found that, in an electrode material for a lithium-ion rechargeable battery formed by coating the surface of an electrode active material represented by General Formula $Li_xA_yD_zPO_4$ (here, A represents at least one element selected from Co, Mn, Ni, Fe, Cu, and Cr, D represents at least one element selected from Mg, Ca, Sr, Ba, Ti, Zn, B, Al, Ga, In, Si, Ge, Sc, and Y, $1 \le x \le 1.1$, $0 < y \le 1$, $0 \leq z < 1$, $0.9 < y+z \leq 1$) with a carbonaceous film, when the saturated adsorbed moisture amount in a carbonaceous film single body, which is detected in a temperature range of room temperature or more and 250° C. or less by means of Karl Fischer (coulometric titration), is set in a predetermined range, it is possible to improve the durability and stability of a lithium-ion rechargeable battery, and completed the present invention.

An electrode material for a lithium-ion rechargeable battery of the present invention is an electrode material for a lithium-ion rechargeable battery formed by coating the surface of an electrode active material represented by General Formula $Li_xA_yD_zPO_4$ (here, A represents at least one element selected from Co, Mn, Ni, Fe, Cu, and Cr, D represents at least one element selected from Mg, Ca, Sr, Ba, Ti, Zn, B, Al, Ga, In, Si, Ge, Sc, and Y, $1 \leq x \leq 1.1$, $0 < y \leq 1$, $0 \leq z < 1$, $0.9 < y+z \leq 1$) with a carbonaceous film, in which a saturated adsorbed moisture amount in a carbonaceous film single body, which is detected in a temperature range of room temperature or more and 250° C. or less by means of Karl Fischer (coulometric titration), is 5000 ppm or more and 50000 ppm or less.

An electrode for a lithium-ion rechargeable battery of the present invention is an electrode for a lithium-ion rechargeable battery including a current collector and an electrode mixture layer formed on the current collector, in which the electrode mixture layer includes the electrode material for a lithium-ion rechargeable battery of the present invention.

A lithium-ion rechargeable battery of the present invention includes the electrode for a lithium-ion rechargeable battery of the present invention.

Effects of the Invention

According to the electrode material for a lithium-ion rechargeable battery of the present invention, since the saturated adsorbed moisture amount in the carbonaceous film coating the surface of the electrode active material is 5000 ppm or more and 50000 ppm or less, it is possible to obtain a lithium-ion rechargeable battery having improved durability and improved stability.

According to the electrode for a lithium-ion rechargeable battery of the present invention, since the electrode material for a lithium-ion rechargeable battery of the present invention is included, it is possible to obtain a lithium-ion rechargeable battery having improved durability and improved stability.

According to the lithium-ion rechargeable battery of the present invention, since the electrode for a lithium-ion rechargeable battery of the present invention is included, it is possible to obtain a lithium-ion rechargeable battery having improved durability and improved stability.

EMBODIMENTS FOR CARRYING OUT THE INVENTION

Embodiments of an electrode material for a lithium-ion rechargeable battery, an electrode for a lithium-ion rechargeable battery, and a lithium-ion rechargeable battery of the present invention will be described.

Meanwhile, the present embodiment is a specific description for easier understanding of the gist of the present invention and, unless particularly otherwise described, does not limit the present invention.

Electrode Material for Lithium-Ion Rechargeable Battery

An electrode material for a lithium-ion rechargeable battery of the present embodiment is an electrode material for a lithium-ion rechargeable battery formed by coating the surface of an electrode active material represented by General Formula $Li_xA_yD_zPO_4$ (here, A represents at least one element selected from Co, Mn, Ni, Fe, Cu, and Cr, D represents at least one element selected from Mg, Ca, Sr, Ba, Ti, Zn, B, Al, Ga, In, Si, Ge, Sc, and Y, $1 \leq x \leq 1.1$, $0 < y \leq 1$, $0 \leq z < 1$, $0.9 < y+z \leq 1$) with a carbonaceous film, in which a saturated adsorbed moisture amount in a carbonaceous film single body, which is detected in a temperature range of room temperature or more and 250° C. or less by means of Karl Fischer (coulometric titration), is 5000 ppm or more and 50000 ppm or less.

The electrode material for a lithium-ion rechargeable battery of the present embodiment is mainly used as a cathode material for a lithium-ion rechargeable battery.

In the electrode material for a lithium-ion rechargeable battery of the present embodiment, the surfaces of primary particles of an electrode active material made of $Li_xA_yD_zPO_4$ are coated with a carbonaceous film.

The average primary particle diameter of the primary particles of the electrode active material made of $Li_xA_yD_zPO_4$ is preferably 50 nm or more and 400 nm or less and more preferably 80 nm or more and 260 nm or less.

Here, the reason for setting the average primary particle diameter of the primary particles of the electrode active material made of $Li_xA_yD_zPO_4$ in the above-described range is as described below. When the average primary particle diameter of the primary particles of the electrode active material made of $Li_xA_yD_zPO_4$ is less than 50 nm, the specific surface area increases, and thus the amount of carbon used for carbonaceous coating is increased, and the discharge capacity per unit mass of the electrode material is decreased. In addition, it becomes difficult to uniformly coat the surfaces of the primary particles of the electrode active material with the carbonaceous film. Therefore, in a lithium-ion rechargeable battery for which the electrode material for a lithium-ion rechargeable battery of the present embodiment is used, the discharge capacity at a high-speed charge and discharge decreases, and it becomes difficult to realize a sufficient charge and discharge performance. On the other hand, when the average primary particle diameter of the primary particles of the electrode active material made of $Li_xA_yD_zPO_4$ exceeds 400 nm, lithium ion diffusion resistance or electron migration resistance among the primary particles of the electrode active material made of $Li_xA_yD_zPO_4$ increases. Therefore, in a lithium-ion rechargeable battery for which the electrode material for a lithium-ion rechargeable battery of the present embodiment is used, the discharge capacity at a high-speed charge and discharge becomes insufficient.

Here, the average particle diameter in the present embodiment refers to the volume-average particle diameter. The average primary particle diameter of the primary particles of the electrode active material made of $Li_xA_yD_zPO_4$ can be measured using a laser diffraction/scattering particle size distribution measurement instrument or the like. In addition, the average particle diameter can be computed by arbitrarily selecting a plurality of primary particles observed using a scanning electron microscope (SEM).

The shape of the primary particle of the electrode active material made of $Li_xA_yD_zPO_4$ is not particularly limited, but is preferably a spherical shape since it is easy to generate a cathode material made of spherical secondary particles, particularly, truly spherical secondary particles.

The reason for the shape of the primary particle of the electrode active material being preferably a spherical shape is that it is possible to decrease the amount of a solvent when an electrode material paste for a lithium-ion rechargeable battery is prepared by mixing the electrode material for a lithium-ion rechargeable battery, a binder resin (binding agent), and a solvent. In addition, it also becomes easy to apply the electrode material paste for a lithium-ion rechargeable battery to a current collector. Furthermore, when the shape of the primary particle of the electrode active material is a spherical shape, the surface area of the primary particles of the electrode active material is minimized, and it is possible to minimize the blending amount of the binder resin (binding agent) added to the electrode material paste for a lithium-ion rechargeable battery. Therefore, the internal resistance of the obtained electrode can be decreased. Furthermore, when the shape of the primary particle of the electrode active material is a spherical shape, it becomes easy to closely pack the primary particles, and the amount of the electrode material for a lithium-ion rechargeable battery packed per unit volume increases. As a result, it is possible to increase the electrode density, and a high-capacity lithium-ion rechargeable battery can be obtained.

The thickness of the carbonaceous film is preferably 1 nm or more and 12 nm or less.

The reason for setting the thickness of the carbonaceous film in the above-described range is as described below. When the thickness is less than 1 nm, the thickness of the carbonaceous film is too thin, and thus it becomes impossible to form a film having a desired resistance value. As a result, conductivity decreases, and it becomes impossible to ensure conductivity suitable for an electrode material. On the other hand, when the thickness of the carbonaceous film exceeds 12 nm, battery activity, for example, the battery capacity per unit mass of the electrode material, decreases.

In addition, the reason for setting the thickness of the carbonaceous film in the above-described range is as described below. Since it becomes easy to closely pack the electrode material, the amount of the electrode material for a lithium-ion rechargeable battery packed per unit volume increases. As a result, it is possible to increase the electrode density, and a high-capacity lithium-ion rechargeable battery can be obtained.

The average particle diameter of the electrode material for a lithium-ion rechargeable battery formed by coating the surfaces of the primary particles of the electrode active material made of $Li_xA_yD_zPO_4$ is preferably 65 nm or more and 400 m or less and more preferably 75 nm or more and 270 nm or less.

Here, the reason for setting the average particle diameter of the electrode material for a lithium-ion rechargeable battery in the above-described range is as described below. When the average particle diameter of the electrode material for a lithium-ion rechargeable battery is less than 65 nm, the specific surface area of the electrode material for a lithium-ion rechargeable battery is increased, and thus the mass of required carbon increases. As a result, in a lithium-ion rechargeable battery for which the electrode material for a lithium-ion rechargeable battery of the present embodiment is used, the charge and discharge capacity is decreased. On the other hand, when the average particle diameter of the electrode material for a lithium-ion rechargeable battery exceeds 400 nm, time is taken for lithium ions or electrons to migrate in the electrode material for a lithium-ion rechargeable battery. As a result, in a lithium-ion rechargeable battery for which the electrode material for a lithium-ion rechargeable battery of the present embodiment is used, the internal resistance increases, and the output characteristics deteriorate, which is not preferable.

The amount of carbon included in the electrode material for a lithium-ion rechargeable battery of the present embodiment is preferably 0.5% by mass or more and 5.0% by mass or less and more preferably 0.8% by mass or more and 2.5% by mass or less.

Here, the reason for limiting the amount of carbon included in the electrode material for a lithium-ion rechargeable battery of the present embodiment in the above-described range is as described below. When the amount of carbon is less than 0.5% by mass, the discharge capacity at a high-speed charge and discharge rate is decreased in a case in which a lithium-ion rechargeable battery is formed, and it becomes difficult to realize sufficient charge and discharge rate performance. On the other hand, when the amount of carbon included in the electrode material for a lithium-ion rechargeable battery exceeds 5.0% bymass, the amount of carbon is too large, and the battery capacity of a lithium-ion rechargeable battery per unit mass of the electrode material for a lithium-ion rechargeable battery is decreased more than necessary.

In the electrode material for a lithium-ion rechargeable battery of the present embodiment, the saturated adsorbed moisture amount in the carbonaceous film single body, which is detected in a temperature range of room temperature (25° C.) or more and 250° C. or less by means of Karl Fischer (coulometric titration), is 5000 ppm or more and 50000 ppm or less, preferably 10000 ppm or more and 40000 ppm or less, and more preferably 14000 ppm or more and 35000 ppm or less.

Here, the reason for limiting the saturated adsorbed moisture amount in the carbonaceous film single body in the electrode material for a lithium-ion rechargeable battery of the present embodiment in the above-described range is as described below. In order to set the saturated adsorbed moisture amount to less than 5000 ppm, time or cost is taken for the thermal treatment or dehydration treatment of the electrode material, and it is not possible to efficiently produce the electrode material at a low cost. On the other hand, when the saturated adsorbed moisture amount exceeds 50000 ppm, it becomes difficult to remove moisture in a dehydration step during the manufacturing of a battery. In addition, the stability and durability of a battery significantly degrade due to generation of gas derived from moisture intruding into a battery or generation of hydrofluoric acid.

In the electrode material for a lithium-ion rechargeable battery of the present embodiment, when the amount of carbon is represented by A, and the specific surface area of the electrode material for a lithium-ion rechargeable battery formed by coating the surfaces of the primary particles of the electrode active material made of $Li_xA_yD_zPO_4$ with the carbonaceous film is represented by B, A and B preferably satisfy $0.07 \leq A/B \leq 0.15$ and more preferably satisfy $0.08 \leq A/B \leq 0.13$. That is, A/B represents a ratio of the amount of carbon to the specific surface area of the electrode material for a lithium-ion rechargeable battery ([the amount of carbon]/[the specific surface area of the electrode material for a lithium-ion rechargeable battery]).

Here, the reason for setting A/B to the above-descried range is as described below. When A/B is less than 0.07, the amount of carbon is too small relative to the surface area of the primary particles, and thus the electron conductivity decreases, and it becomes difficult to realize sufficient charge and discharge characteristics. On the other hand, when A/B exceeds 0.15, the amount of carbon is too large, and thus the battery capacity of a lithium-ion rechargeable battery per unit mass of the electrode material for a lithium-ion rechargeable battery is decreased more than necessary.

The specific surface area of the electrode material for a lithium-ion rechargeable battery of the present embodiment is preferably 6 m$^2$/g or more and 25 m$^2$/g or less and more preferably 8 m$^2$/g or more and 20 m$^2$/g or less.

Here, the reason for limiting the specific surface area of the electrode material for a lithium-ion rechargeable battery of the present embodiment in the above-described range is as described below. When the specific surface area is less than 6 m$^2$/g, it takes time for lithium ions or electrons to migrate in the electrode material for a lithium-ion rechargeable battery, and thus the internal resistance increases, and the output characteristics deteriorate, which is not preferable. On the other hand, the specific surface area exceeds 25 m$^2$/g, the specific surface area of the electrode material for a lithium-ion rechargeable battery is increased, and thus the mass of required carbon is increased, and the charge and discharge capacity is decreased, which is not preferable.

Method for Manufacturing Electrode Material for Lithium-Ion Rechargeable Battery A method for manufacturing an electrode material for a lithium-ion rechargeable battery is a method for manufacturing an electrode material for a lithium-ion rechargeable battery formed by coating the surface of the electrode active material represented by General Formula Li$_x$A$_y$D$_z$PO$_4$ (here, A represents at least one element selected from Co, Mn, Ni, Fe, Cu, and Cr, D represents at least one element selected from Mg, Ca, Sr, Ba, Ti, Zn, B, Al, Ga, In, Si, Ge, Sc, and Y, $1 \leq x \leq 1.1$, $0 < y \leq 1$, $0 \leq z < 1$, $0.9 < y+z \leq 1$) with a carbonaceous film, including, for example, a first step of preparing a raw material slurry obtained by mixing a Li source, an A source (here, A represents at least one element selected from Co, Mn, Ni, Fe, Cu, and Cr), a D source (here, D represents at least one element selected from Mg, Ca, Sr, Ba, Ti, Zn, B, Al, Ga, In, Si, Ge, Sc, and Y), a P source, and the like with a solvent including water as a main component and a second step of reacting the raw material slurry at a high temperature and a high pressure.

In the method for manufacturing an electrode material for a lithium-ion rechargeable battery of the present embodiment, the Li source, the A source (here, A represents at least one element selected from Co, Mn, Ni, Fe, Cu, and Cr), the D source (here, D represents at least one element selected from Mg, Ca, Sr, Ba, Ti, Zn, B, Al, Ga, In, Si, Ge, Sc, and Y), the P source, and an organic compound are injected into the solvent including water as a main component and are uniformly dispersed by means of stirring, thereby preparing a raw material slurry for the electrode material for a lithium-ion rechargeable battery.

Hereinafter, in some cases, the Li source, the A source, the D source, the P source, and the like will be collectively referred to as a precursor of the electrode active material.

When uniform mixing is taken into account, it is preferable that the Li source, the A source, the D source, the P source, and the like are respectively put into a state of an aqueous solution temporarily and then mixed together.

The molar concentrations of the Li source, the A source, the D source, the P source, and the like in the raw material slurry is preferably 1.1 mol/L or more and 2.2 mol/L or less since it is necessary to obtain extremely fine Li$_x$A$_y$D$_z$PO$_4$ particles having a high purity and high crystallinity.

Examples of the Li source include hydroxides such as lithium hydroxide (LiOH), inorganic lithium acid salts such as lithium carbonate (Li$_2$CO$_3$), lithium chloride (LiCl), lithium nitrate (LiNO$_3$), lithium phosphate (Li$_3$PO$_4$), lithium hydrogen phosphate (Li$_2$HPO$_4$), and lithium dihydrogen phosphate (LiH$_2$PO$_4$), organic lithium acid salts such as lithium acetate (LiCH$_3$COO) and lithium oxalate ((COOLi)$_2$), and hydrates thereof. As the Li source, at least one selected from the above-described group is preferably used.

Meanwhile, lithium phosphate (Li$_3$PO$_4$) can also be used as the Li source and the P source.

As the P source, for example, at least one compound selected from phosphoric acids such as orthophosphoric acid (H$_3$PO$_4$) and metaphosphoric acid (HPO$_3$), phosphoric salts such as ammonium dihydrogen phosphate (NH$_4$H$_2$PO$_4$), diammonium phosphate ((NH$_4$)$_2$HPO$_4$), ammonium phosphate ((NH$_4$)$_3$PO$_4$), lithium phosphate (Li$_3$PO$_4$), lithium hydrogen phosphate (Li$_2$HPO$_4$), and lithium dihydrogen phosphate (LiH$_2$PO$_4$), and hydrates thereof is preferably used.

As the Fe source, for example, iron compounds such as iron (II) chloride (FeCl$_2$), iron (II) sulfate (FeSO$_4$), and iron (II) acetate (Fe(CH$_3$COO)$_2$) or hydrates thereof, trivalent iron compounds such as iron (III) nitrate (Fe(NO$_3$)$_3$), iron (III) chloride (FeCl$_3$), and iron (III) citrate (FeC$_6$H$_5$O$_7$), lithium iron phosphate, or the like can be used.

The Mn source is preferably an Mn salt, and examples thereof include manganese (II) chloride (MnCl$_2$), manganese (II) sulfate (MnSO$_4$), manganese (II) nitrate (Mn(NO$_3$)$_2$), manganese (II) acetate (Mn(CH$_3$COO)$_2$), and hydrates thereof. As the Mn source, at least one compound selected from the above-described group is preferably used.

An Mg source is preferably an Mg salt, and examples thereof include magnesium (II) chloride (MgCl$_2$), magnesium (II) sulfate (MgSO$_4$), magnesium (II) nitrate (Mg(NO$_3$)$_2$), magnesium (II) acetate (Mg(CH$_3$COO)$_2$), and hydrates thereof. As the Mg source, at least one compound selected from the above-described group is preferably used.

As other metal sources such as a Ca source and a Zn source, chlorides, hydrosulfates, acetates, and the like are preferably used.

Examples of the organic compound include polyvinyl alcohols, polyvinylpyrrolidone, cellulose, starch, gelatin, carboxymethyl cellulose, methyl cellulose, hydroxymethyl cellulose, hydroxyethyl cellulose, polyacrylic acid, polystyrene sulfonate, polyacrylamide, polyvinyl acetate, glucose, fructose, galactose, mannose, maltose, sucrose, lactose, glycogen, pectin, alginic acid, glucomannan, chitin, hyaluronic acid, chondroitin, agarose, polyether, polyhydric alcohols, and the like.

Examples of the polyhydric alcohols include polyethylene glycol, polypropylene glycol, polyglycerin, glycerin, and the like.

The purity of carbon in the organic compound is preferably 60% or more and more preferably 65% or more. The purity of carbon in the organic compound refers to a proportion of the amount of carbon (total atomic amount) in the molecular weight of the organic compound. For example, for a polyvinyl alcohol (CH$_2$CH(OH))$_n$, since the molecular weight is 44.05 and the amount of carbon is 24.02, the purity of carbon in the polyvinyl alcohol reaches 55% (24.02/44.05×100).

When the purity of carbon in the organic compound is less than 60%, a highly polar functional group including hydrogen or oxygen is likely to remain in a carbonaceous film generated due to a thermal treatment of the organic compound. As a result, the adsorbed moisture amount in the carbonaceous film increases or the surface activity of the carbonaceous film increases, generation of hydrofluoric acid or generation of gas due to a reaction with an electrolytic solution is induced, and there are cases in which the stability and durability of a battery significantly degrade.

The blending ratio of the organic compound to the electrode active material or the precursor of the electrode active material is preferably 0.6 parts by mass or more and 10 parts by mass or less and more preferably 0.8 parts by mass or more and 4.0 parts by mass or less with respect to 100 parts by mass of the electrode active material or the precursor of the electrode active material when the total mass of the organic compound is converted to the amount of carbon.

When the blending ratio of the organic compound in terms of the amount of carbon is less than 0.6 parts by mass, the coating ratio of the surface of the electrode active material with the carbonaceous film generated by thermally treating the organic compound is below 80%. As a result, in a case in which a battery is formed, the discharge capacity at a high-speed charge and discharge rate decreases, and it becomes difficult to realize a sufficient charge and discharge rate performance. On the other hand, when the blending ratio of the organic compound in terms of the amount of carbon exceeds 10 parts by mass, the blending ratio of the electrode active material is relatively decreased, in a case in which a battery is formed, the capacity of a battery decreases, and the bulk density of the electrode active material increases due to the carbonaceous film excessively supported by the electrode active material. As a result, the electrode density decreases, and it becomes impossible to ignore a decrease in the battery capacity of a lithium-ion rechargeable battery per unit volume.

A solvent that dissolves or disperses the electrode active material or the precursor of the electrode active material and the organic compound is preferably water, and examples of other solvents include alcohols such as methanol, ethanol, 1-propanol, 2-propanol (isopropyl alcohol: IPA), butanol, pentanol, hexanol, octanol, and diacetone alcohol, esters such as ethyl acetate, butyl acetate, ethyl lactate, propylene glycol monomethyl ether acetate, propylene glycol monoethyl ether acetate, and γ-butyrolactone, ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether, and diethylene glycol monoethyl ether, ketones such as acetone, methyl ethyl ketone (MEK), methyl isobutyl ketone (MIBK), acetyl acetone, and cyclohexanone, amides such as dimethyl formamide, N,N-dimethylacetoacetamide, and N-methyl pyrrolidone, glycols such as ethylene glycol, diethylene glycol, and propylene glycol, and the like. These solvents may be singly used or in a mixture form of two or more solvents.

When the raw material slurry is prepared, a dispersing agent may be added thereto as necessary. Furthermore, in addition to the electrode active material or the precursor of the electrode active material and the organic compound, the raw material slurry may also include a carbonization catalyst for accelerating carbonization of the organic compound during a thermal treatment described below.

A method for dispersing the electrode active material or the precursor of the electrode active material and the organic compound in the solvent is not particularly limited as long as the electrode active material or the precursor of the electrode active material is uniformly dispersed, and the organic compound is dissolved or dispersed. As the above-described dispersion method, for example, a method in which a medium stirring-type dispersion device in which medium particles are stirred at a high speed such as a planetary ball mill, a vibratory ball mill, a beads mill, a paint shaker, or an attritor is used is preferred.

When the electrode active material or the precursor of the electrode active material and the organic compound are dissolved or dispersed, it is preferable to disperse the precursor of the electrode active material in a primary particle form in a solvent and then stir the organic compound so as to be dissolved. In such a case, the surfaces of the primary particles of the electrode active material or the precursor of the electrode active material are coated with the organic compound, and consequently, a carbonaceous film derived from the organic compound is uniformly interposed between the electrode active materials or the primary particles of the electrode active material.

Next, the raw material slurry is sprayed using a spray-pyrolysis method and dried in a high-temperature atmosphere, for example, in the air at a temperature of 70° C. or more and 250° C. or less, thereby generating a granulated body.

In the spray-pyrolysis method, in order to generate a substantially spherical granulated body by rapidly drying the raw material slurry, the particle diameter of a liquid droplet during the spraying is preferably 0.5 μm or more and 100 μm or less.

Next, the granulated body is thermally treated in an inert atmosphere or a reducing atmosphere. The thermal treatment temperature is preferably 650° C. or more and 1000° C. or less and more preferably 700° C. or more and 900° C. or less.

The inert atmosphere is preferably an atmosphere formed of an inert gas such as nitrogen ($N_2$) or argon (Ar). In a case in which it is necessary to further suppress oxidation of the granulated body, a reducing atmosphere including a reducing gas such as hydrogen ($H_2$) is preferred.

Here, the reason for the thermal treatment temperature being preferably 650° C. or more and 1000° C. or less is as described below. When the thermal treatment temperature is lower than 650° C., the organic compound is not sufficiently decomposed and reacted, the organic compound is not sufficiently carbonized, and a decomposed and reacted substance being generated turns into an organic decomposed substance having a high resistance, which is not preferable. On the other hand, when the thermal treatment temperature exceeds 1000° C., a component constituting the electrode active material, for example, lithium (Li), evaporates and thus the composition deviates. In addition, grain growth in the electrode active material is accelerated, in a case in which a battery is formed, the discharge capacity at a high-speed charge and discharge rate decreases, and it becomes difficult to realize a sufficient charge and discharge rate performance.

The thermal treatment duration is not particularly limited as long as the organic compound is sufficiently carbonized and, for example, is set to 0.1 hours or more and 10 hours or less.

In a case in which the precursor of the electrode active material is included in the granulated body, the precursor of the electrode active material turns into an electrode active material. Meanwhile, the organic compound is decomposed and reacted during the thermal treatment so as to generate carbon, and the carbon is attached to the surface of the electrode active material, thereby forming a carbonaceous film. As a result, the surface of the electrode active material is coated with the carbonaceous film.

Here, in a case in which the electrode active material includes lithium as a constitutional component, as the thermal treatment duration increases, lithium diffuses into the carbonaceous film from the electrode active material and is present in the carbonaceous film and thus the conductivity of the carbonaceous film further improves, which is preferable.

However, when the thermal treatment duration becomes too long, abnormal grain growth occurs or an electrode active material in which lithium is partially deficient is generated, and thus the performance of the electrode active material degrades. As a result, the characteristics of a battery for which the electrode active material is used degrade.

Electrode for Lithium-Ion Rechargeable Battery

A cathode for a lithium-ion rechargeable battery of the present embodiment includes a current collector and an electrode mixture layer (electrode) formed on the current collector, and the electrode mixture layer includes the electrode material for a lithium-ion rechargeable battery of the present embodiment.

That is, the electrode for a lithium-ion rechargeable battery of the present embodiment is obtained by forming an electrode mixture layer on one main surface of a current collector using the electrode material for a lithium-ion rechargeable battery of the present embodiment.

The electrode for a lithium-ion rechargeable battery of the present embodiment is mainly used as a cathode for a lithium-ion rechargeable battery.

A method for manufacturing the electrode for a lithium-ion rechargeable battery of the present embodiment is not particularly limited as long as the electrode can be formed on one main surface of a current collector using the electrode material for a lithium-ion rechargeable battery of the present embodiment. Examples of the method for manufacturing the electrode for a lithium-ion rechargeable battery of the present embodiment include the following method.

First, an electrode material paste for a lithium-ion rechargeable battery of the present embodiment is prepared by mixing the electrode material for a lithium-ion rechargeable battery of the present embodiment, a binding agent, and a solvent.

In addition, a conductive auxiliary agent may be added to the electrode material for a lithium-ion rechargeable battery of the present embodiment as necessary.

Binding Agent

As the binding agent, that is, a binder resin, for example, a polytetrafluoroethylene (PTFE) resin, a polyvinylidene fluoride (PVdF) resin, fluorine rubber, or the like is preferably used.

The blending ratio of the binding agent to the electrode material for a lithium-ion rechargeable battery of the present embodiment is not particularly limited and, for example, the amount of the binding agent is preferably 1 part by mass or more and 30 parts by mass or less and more preferably 3 parts by mass or more and 20 parts by mass or less with respect to 100 parts by mass of the electrode material for a lithium-ion rechargeable battery.

Here, the reason for setting the blending ratio of the binding agent to the electrode material for a lithium-ion rechargeable battery of the present embodiment in the above-described range is as described below. When the blending ratio of the biding agent is less than 1 part by mass, in a case in which the electrode mixture layer is formed using the electrode material paste for a lithium-ion rechargeable battery including the electrode material for a lithium-ion rechargeable battery of the present embodiment, binding between the electrode mixture layer and the current collector is not sufficient. Therefore, there are cases in which the electrode mixture layer is cracked or dropped during rolling or the like of the electrode mixture layer, which is not preferable. In addition, there are cases in which the electrode mixture layer is peeled off from the current collector in a charge and discharge process of a battery and the battery capacity or the charge and discharge rate decreases, which is not preferable. On the other hand, when the blending ratio of the binding agent exceeds 30 parts by mass, there are cases in which the internal resistance of the electrode material for a lithium-ion rechargeable battery increases and the battery capacity decreases at a high-speed charge and discharge rate, which is not preferable.

Conductive Auxiliary Agent

The conductive auxiliary agent is not particularly limited, and, as the conductive auxiliary agent, for example, at least one conductive auxiliary agent selected from a group of fibrous carbon such as acetylene black, Ketjen black, furnace black, vapor grown carbon fiber (VGCF), and carbon nanotube can be used.

Solvent

To the electrode material paste for a lithium-ion rechargeable battery including the electrode material for a lithium-ion rechargeable battery of the present embodiment, a solvent is appropriately added in order to facilitate coating of an article to be coated such as a current collector.

Examples of the solvent include water; alcohols such as methanol, ethanol, 1-propanol, 2-propanol (isopropyl alcohol: IPA), butanol, pentanol, hexanol, octanol, and diacetone alcohol; esters such as ethyl acetate, butyl acetate, ethyl lactate, propylene glycol monomethyl ether acetate, propylene glycol monoethyl ether acetate, and γ-butyrolactone; ethers such as diethyl ether, ethylene glycol monomethyl ether (methyl cellosolve), ethyleneglycolmonoethylether (ethylcellosolve), ethylene glycol monobutyl ether (butyl cellosolve), diethylene glycol monomethyl ether, and diethylene glycol monoethyl ether; ketones such as acetone, methyl ethyl ketone (MEK), methyl isobutyl ketone (MIBK), acetyl acetone, and cyclohexanone; amides such as dimethyl formamide, N,N-dimethylacetoacetamide, and N-methyl pyrrolidone; glycols such as ethylene glycol, diethylene glycol, and propylene glycol; and the like. These solvents may be singly used or in a mixture form of two or more solvents.

When the content rate of the solvent in the electrode material paste for a lithium-ion rechargeable battery is preferably 50% by mass or more and 70% by mass or less and more preferably 55% by mass or more and 65% by mass or less in a case in which the total mass of the electrode material for a lithium-ion rechargeable battery of the present embodiment, the binding agent, and the solvent is set to 100% by mass.

When the solvent is included in the above-described range, it is possible to obtain an electrode material paste for a lithium-ion rechargeable battery having excellent electrode formability and excellent battery characteristics.

A method for mixing the electrode material for a lithium-ion rechargeable battery of the present embodiment, the binding agent, the conductive auxiliary agent, and the solvent is not particularly limited as long as it is possible to uniformly mix the above-described components. Examples thereof include methods in which a kneader such as a ball mill, a sand mill, a planetary mixer, a paint shaker, or a homogenizer is used.

Next, the electrode material paste for a lithium-ion rechargeable battery is applied to one main surface of the current collector so as to forma coating, and the coating is dried and then pressed under pressure, whereby it is possible to obtain an electrode for a lithium-ion rechargeable battery including the electrode mixture layer formed on one main surface of the electrode current collector.

Lithium-Ion Rechargeable Battery

A lithium-ion rechargeable battery of the present embodiment includes the electrode for a lithium-ion rechargeable battery of the present embodiment as a cathode, an anode, a separator, and an electrolytic solution.

In the lithium-ion rechargeable battery of the present embodiment, the anode, the electrolytic solution, the separator, and the like are not particularly limited.

As the anode, for example, an anode material such as metallic Li, a carbon material, a Li alloy, or $Li_4Ti_5O_{12}$ can be used.

Electrolytic Solution

The electrolytic solution can be produced by, for example, mixing ethylene carbonate (EC) and ethyl methyl carbonate (EMC) so that the volume ratio therebetween reaches 1:1 and dissolving lithium hexafluorophosphate ($LiPF_6$) in the obtained solvent mixture so that the concentration thereof reaches, for example, 1 $mol/dm^3$.

Separator

As the separator, it is possible to use, for example, porous polypropylene.

In addition, a solid electrolyte may be used instead of the electrolytic solution and the separator.

In the lithium-ion rechargeable battery of the present embodiment, since the electrode for a lithium-ion rechargeable battery of the present embodiment is used as the cathode, the lithium-ion rechargeable battery has a high capacity and a high energy density.

As described above, according to the electrode material for a lithium-ion rechargeable battery of the present embodiment, since the saturated adsorbed moisture amount in the carbonaceous film single body coating the surface of the electrode active material is 5000 ppm or more and 50000 ppm or less, it is possible to obtain a lithium-ion rechargeable battery having improved durability and improved stability.

According to the electrode for a lithium-ion rechargeable battery of the present invention, since the electrode material for a lithium-ion rechargeable battery of the present embodiment is included, it is possible to obtain a lithium-ion rechargeable battery having improved durability and improved stability.

According to the lithium-ion rechargeable battery of the present embodiment, since the electrode for a lithium-ion rechargeable battery of the present embodiment is included as a cathode, it is possible to obtain a lithium-ion rechargeable battery having improved durability and improved stability.

EXAMPLES

Hereinafter, the present invention will be more specifically described using examples and comparative examples, but the present invention is not limited to the following examples.

Example 1

Synthesis of Electrode Material for Lithium-Ion Rechargeable Battery

Lithium phosphate ($Li_3PO_4$) as a Li source and a P source, iron (II) sulfate ($FeSO_4$) as a Fe source, and manganese (II) sulfate ($MnSO_4$) as a Mn source were mixed together so that the molar ratio therebetween reached Li:Fe:Mn:P=3:0.3:0.7:1. Furthermore, distilled water for adjustment was mixed thereinto, thereby preparing 600 ml of a raw material slurry.

Next, this raw material slurry was put into a pressure-resistant airtight container, was hydrothermally synthesized at 180° C. for two hours, and then was cooled to room temperature (25° C.), thereby obtaining a cake-form electrode active material precipitated in the container.

These electrode active material particles were sufficiently washed with distilled water a plurality of times, and then the electrode active material particles and the distilled water were mixed together so that the water content ratio thereof reached 50% by mass, thereby preparing a suspension slurry.

The suspension slurry was injected into a sand mill together with zirconia balls having a diameter of 1 mm, and a dispersion treatment was carried out with the treatment duration using the sand mill adjusted so that D90/D10 of electrode active material particles in the suspension slurry reached 10. Meanwhile, D90/D10 is a value obtained by dividing the particle diameter (D90) at which the cumulative volume percentage in the particle size distribution reaches 90% by the particle diameter (D10) at which the cumulative volume percentage in the particle size distribution reaches 10%.

Next, a solution obtained by dissolving 10% by mass of 2-(p-tolyl)benzoic acid in methanol in advance was mixed with the slurry that had undergone the dispersion treatment in an amount of 3% by mass of the electrode active material particles in terms of the solid content of 2-(p-tolyl)benzoic acid. Next, an aqueous solution of polyvinyl alcohol (PVA) adjusted in advance to be 10% by mass was mixed therewith in an amount of 0.5% by mass of the electrode material particles in terms of the solid content of polyvinyl alcohol, and the mixed slurry was sprayed and dried at 180° C. in an inert atmosphere, thereby obtaining a dried substance of electrode material particles.

The obtained dried substance was thermally treated at 700° C. for one hour in an inert atmosphere so as to support carbon on the electrode active material particles, and an electrode material for a lithium-ion rechargeable battery of Example 1 was obtained.

Production of Lithium-Ion Rechargeable Battery

Acetylene black (auxiliary conductive agent) (5 parts by weight) was added to the electrode material for a lithium-ion rechargeable battery (90 parts by mass), and the components were uniformly mixed together using a planetary mixer. Polyvinylidene fluoride (5 parts by mass in terms of solid content) dissolved in N-methyl-2-pyrrolidinone in advance was added as a binding agent to the obtained powder mixture. Furthermore, N-methyl-2-pyrrolidinone was added thereto so that the solid content in the paste reached 40% by mass, and the components were mixed together using a planetary mixer, thereby preparing an electrode material paste.

Next, the electrode material paste was applied to a surface of a 30 μm-thick aluminum foil (current collector) so as to form a coating, and the coating was dried at 120° C. under reduced pressure for 10 hours, thereby forming an electrode mixture layer on the surface of the aluminum foil.

After that, the electrode mixture layer was pressed at a pressure of 200 $kgf/cm^2$ so as to obtain a disc having a predetermined size by means of punching, thereby producing a cathode for a lithium-ion rechargeable battery of Example 1.

The cathode for a lithium-ion rechargeable battery and an anode made of a lithium metal were disposed through a separator made of a porous polypropylene film in a stainless steel storage container.

Meanwhile, ethylene carbonate and diethyl carbonate were mixed together so that the volume ratio therebetween reached 1:1, thereby preparing a solvent mixture. $LiPF_6$ was added thereto as an electrolyte, thereby preparing an electrolyte solution which was made of 1 mol/L of $LiPF_6$ and had lithium ion conductivity. Next, the electrolyte solution was injected into the storage container, the cathodes, the anode, and the separator were sufficiently immersed in the electrolyte solution, and the storage container was sealed in a sealed body equipped with a gasket, thereby producing the lithium-ion rechargeable battery of Example 1.

Evaluation of Electrode Material for Lithium-Ion Rechargeable Battery (1) Composition The composition of the electrode material for a lithium-ion rechargeable battery was evaluated using an ICP atomic emission spectroscope (trade name: SPS3500-DD, manufactured by Hitachi High-Technologies Corporation). Meanwhile, the electrode material for a lithium-ion rechargeable battery was dissolved in a dense aqueous solution of hydrochloric acid, and an aqueous solution from which a carbonaceous film was filtered out was used as a specimen for composition evaluation.

The results are shown in Table 1.

(2) Specific Surface Area

The specific surface area of the electrode material for a lithium-ion rechargeable battery was measured using a specific surface area meter (trade name: BELSORP-mini, manufactured by MicrotracBEL Corp.) by means of a BET method in which nitrogen ($N_2$) adsorption was used.

The results are shown in Table 1.

(3) Amount of Carbon

The amount of carbon in the electrode material for a lithium-ion rechargeable battery was measured using a carbon analyzer (trade name: EMIA-220V, manufactured by Horiba Ltd.).

The results are shown in Table 1.

(4) Saturated Adsorbed Moisture Amount in Carbonaceous Film

The electrode material for a lithium-ion rechargeable battery was immersed in an aqueous solution of 20% by mass of hydrochloric acid, then, was stirred at room temperature for one week so as to dissolve only the electrode active material, and the solution was filtered, thereby isolating a carbonaceous film. The isolated carbonaceous film was sufficiently washed with distilled water a plurality of times, then, was dried at 70° C. for two hours in a vacuum, and subsequently, was thermally treated in an inert atmosphere at a predetermined carbonization calcination temperature for a predetermined duration.

The amount of moisture detected from room temperature (25° C.) to 250° C. in powder of the obtained carbonaceous film was measured using a Karl Fischer moisture meter (trade name: CA-200/VA-200, manufactured by Mitsubishi Chemical Analytech Co., Ltd.).

The results are shown in Table 1.

Evaluation of Lithium-Ion Rechargeable Battery (1) Initial Discharge Capacity

A charging and discharging test of the lithium-ion rechargeable battery was carried out at room temperature (25° C.) under a cut-off voltage 2 V or more and 4.3 V or less and a constant current of a charge and discharge rate of 0.1 C (the battery was charged for ten hours and then was discharged for ten hours), and the initial discharge capacity was measured.

The results are shown in Table 1.

(2) Load Characteristics

After the initial discharge capacity was measured, a charging and discharging test of the lithium-ion rechargeable battery was carried out at room temperature (25° C.) under a cut-off voltage of 2 V or more and 4.3 V or less and a constant current of a charge rate of 0.2 C (the battery was charged for five hours) and under a constant current of a discharge rate of 3 C (the battery was discharged for 20 minutes), and the discharge capacity was measured.

The ratio between the 0.1 C discharge capacity (initial discharge capacity) and the 3 C discharge capacity was used as load characteristics and was computed using Expression (1) below.

$$\text{Load characteristics (\%)} = (3 \text{ C discharge capacity}/0.1 \text{ C initial discharge capacity}) \times 100 \quad (1)$$

The results are shown in Table 1.

(3) Cycle Characteristics

A charging and discharging test of the lithium-ion rechargeable battery was repeated 100 times at 40° C. under a cut-off voltage of 2 V or more and 4.3 V or less and a constant current of a charge and discharge rate of 1 C (the battery was charged for one hour and then was discharged for one hour).

The ratio between the discharge capacity at the first test and the discharge capacity at the 100th test was used as cycle characteristics (discharge capacity retention) and was computed using Expression (2) below.

$$\text{Cycle characteristics (\%)} = (\text{discharge capacity at 100th test}/\text{discharge capacity at first test}) \times 100 \quad (2)$$

The results are shown in Table 1.

Example 2

Lithium phosphate ($Li_3PO_4$) as a Li source and a P source, iron (II) sulfate ($FeSO_4$) as a Fe source, and manganese (II) sulfate ($MnSO_4$) as a Mn source were mixed together so that the molar ratio therebetween reached Li:Fe:Mn:P=3:0.15:0.85:1. In addition, a solution obtained by dissolving 10% by mass of 2-(p-tolyl)benzoic acid in methanol in advance was mixed with a slurry that had undergone a dispersion treatment for which a sand mill had been used in an amount of 2.5% by mass of the electrode active material particles in terms of the solid content of 2-(p-tolyl)benzoic acid. Next, an aqueous solution of lactose adjusted in advance to be 10% by mass was mixed therewith in an amount of 2.5% by mass of the electrode active material particles in terms of the solid content of lactose. Except for what has been described above, an electrode material for a lithium-ion rechargeable battery of Example 2 was produced in the same manner as in Example 1.

The electrode material for a lithium-ion rechargeable battery of Example 2 was evaluated in the same manner as in Example 1. The results are shown in Table 1.

In addition, a lithium-ion rechargeable battery of Example 2 was produced in the same manner as in Example 1 except for the fact that the electrode material for a lithium-ion rechargeable battery of Example 2 was used.

The lithium-ion rechargeable battery of Example 2 was evaluated in the same manner as in Example 1. The results are shown in Table 1.

Example 3

The masses of individual raw materials of lithium acetate ($LiCH_3COO$) as a Li source, iron (II) acetate ($Fe(CH_3COO)_2$) as a Fe source, and orthophosphoric acid ($H_3PO_4$) as a P source were adjusted so as to include 2% by mass of $LiFePO_4$ relative to 98% by mass of water-washed electrode active material particles, and the electrode active material particles, other raw materials, and distilled water were mixed together so that the water content rate reached 50% by mass, thereby preparing a suspension slurry for a dispersion treatment for which a sand mill was used. Next, a solution obtained by dissolving 10% by mass of 2-(p-tolyl)benzoic acid in methanol in advance was mixed with the slurry that had undergone the dispersion treatment for which a sand mill had been used in an amount of 2% by mass of the electrode active material particles in terms of the solid content of 2-(p-tolyl)benzoic acid. Next, an aqueous solution of polyvinyl alcohol adjusted in advance to be 10% by mass was mixed therewith in an amount of 2.5% by mass of the electrode active material particles in terms of the solid content of polyvinyl alcohol. Except for what has been described above, an electrode material for a lithium-ion rechargeable battery of Example 3 was produced in the same manner as in Example 2.

The electrode material for a lithium-ion rechargeable battery of Example 3 was evaluated in the same manner as in Example 1. The results are shown in Table 1.

In addition, a lithium-ion rechargeable battery of Example 3 was produced in the same manner as in Example 1 except for the fact that the electrode material for a lithium-ion rechargeable battery of Example 3 was used.

The lithium-ion rechargeable battery of Example 3 was evaluated in the same manner as in Example 1. The results are shown in Table 1.

Example 4

Lithium phosphate ($Li_3PO_4$) as a Li source and a P source, iron (II) sulfate ($FeSO_4$) as a Fe source, manganese (II) sulfate ($MnSO_4$) as a Mn source, and magnesium (II) sulfate ($MgSO_4$) as a Mg source were mixed together so that the molar ratio therebetween reached Li:Fe:Mn:Mg:P=3:0.29:0.7:0.01:1. In addition, a solution obtained by dissolving 10% bymass of 2-(p-tolyl)benzoic acid in methanol in advance was mixed with a slurry that had undergone a dispersion treatment for which a sand mill had been used in an amount of 2% by mass of the electrode active material particles in terms of the solid content of 2-(p-tolyl)benzoic acid. Next, an aqueous solution of polyvinyl alcohol adjusted in advance to be 10% by mass was mixed therewith in an amount of 2.5% by mass of the electrode active material particles in terms of the solid content of polyvinyl alcohol. Except for what has been described above, an electrode material for a lithium-ion rechargeable battery of Example 4 was produced in the same manner as in Example 1.

The electrode material for a lithium-ion rechargeable battery of Example 4 was evaluated in the same manner as in Example 1. The results are shown in Table 1.

In addition, a lithium-ion rechargeable battery of Example 4 was produced in the same manner as in Example 1 except for the fact that the electrode material for a lithium-ion rechargeable battery of Example 4 was used.

The lithium-ion rechargeable battery of Example 4 was evaluated in the same manner as in Example 1. The results are shown in Table 1.

Example 5

Lithium phosphate ($Li_3PO_4$) as a Li source and a P source, iron (II) sulfate ($FeSO_4$) as a Fe source, manganese (II) sulfate ($MnSO_4$) as a Mn source, and magnesium (II) sulfate ($MgSO_4$) as a Mg source were mixed together so that the molar ratio therebetween reached Li:Fe:Mn:Mg:P=3:0.25:0.7:0.05:1. In addition, a solution obtained by dissolving 10% by mass of 2-(p-tolyl)benzoic acid in methanol in advance was mixed with a slurry that had undergone a dispersion treatment for which a sand mill had been used in an amount of 2.5% by mass of the electrode active material particles in terms of the solid content of 2-(p-tolyl)benzoic acid. Next, an aqueous solution of polyvinyl alcohol adjusted in advance to be 10% by mass was mixed therewith in an amount of 1.5% by mass of the electrode active material particles in terms of the solid content of polyvinyl alcohol. Except for what has been described above, an electrode material for a lithium-ion rechargeable battery of Example 5 was produced in the same manner as in Example 1.

The electrode material for a lithium-ion rechargeable battery of Example 5 was evaluated in the same manner as in Example 1. The results are shown in Table 1.

In addition, a lithium-ion rechargeable battery of Example 5 was produced in the same manner as in Example 1 except for the fact that the electrode material for a lithium-ion rechargeable battery of Example 5 was used.

The lithium-ion rechargeable battery of Example 5 was evaluated in the same manner as in Example 1. The results are shown in Table 1.

Example 6

Lithium phosphate ($Li_3PO_4$) as a Li source and a P source, iron (II) sulfate ($FeSO_4$) as a Fe source, manganese (II) sulfate ($MnSO_4$) as a Mn source, and zinc (II) sulfate ($ZnSO_4$) as a Zn source were mixed together so that the molar ratio therebetween reached Li:Fe:Mn:Zn:P=3:0.29:0.7:0.01:1. Except for what has been described above, an electrode material for a lithium-ion rechargeable battery of Example 6 was produced in the same manner as in Example 4.

The electrode material for a lithium-ion rechargeable battery of Example 6 was evaluated in the same manner as in Example 1. The results are shown in Table 1.

In addition, a lithium-ion rechargeable battery of Example 6 was produced in the same manner as in Example 1 except for the fact that the electrode material for a lithium-ion rechargeable battery of Example 6 was used.

The lithium-ion rechargeable battery of Example 6 was evaluated in the same manner as in Example 1. The results are shown in Table 1.

Example 7

Lithium phosphate ($Li_3PO_4$) as a Li source and a P source, iron (II) sulfate ($FeSO_4$) as a Fe source, manganese (II) sulfate ($MnSO_4$) as a Mn source, and magnesium (II) sulfate ($MgSO_4$) as a Mg source were mixed together so that the molar ratio therebetween reached Li:Fe:Mn:Mg:P=3:0.25:0.7:0.05:1. In addition, the masses of individual raw materials of lithium acetate ($LiCH_3COO$) as a Li source, iron (II) acetate ($Fe(CH_3COO)_2$) as a Fe source, and orthophosphoric acid ($H_3PO_4$) as a P source were adjusted so as to include 2% by mass of $LiFePO_4$ relative to 98% by mass of water-washed electrode active material particles. Furthermore, the electrode active material particles, other raw materials, and distilled water were mixed together so that the water content rate reached 50% by mass, thereby preparing a suspension slurry for a dispersion treatment for which a sand mill was used. Except for what has been described above, an electrode material for a lithium-ion rechargeable battery of Example 7 was produced in the same manner as in Example 4.

The electrode material for a lithium-ion rechargeable battery of Example 7 was evaluated in the same manner as in Example 1. The results are shown in Table 1.

In addition, a lithium-ion rechargeable battery of Example 7 was produced in the same manner as in Example 1 except for the fact that the electrode material for a lithium-ion rechargeable battery of Example 7 was used.

The lithium-ion rechargeable battery of Example 7 was evaluated in the same manner as in Example 1. The results are shown in Table 1.

Example 8

Lithium phosphate ($Li_3PO_4$) as a Li source and a P source, iron (II) sulfate ($FeSO_4$) as a Fe source, manganese (II) sulfate ($MnSO_4$) as a Mn source, magnesium (II) sulfate ($MgSO_4$) as a Mg source, and zinc (II) sulfate ($ZnSO_4$) as a Zn source were mixed together so that the molar ratio therebetween reached Li:Fe:Mn:Mg:Zn:P=3:0.24:0.7:0.05:0.01:1. Except for what has been described above, an electrode material for a lithium-ion rechargeable battery of Example 8 was produced in the same manner as in Example 4.

The electrode material for a lithium-ion rechargeable battery of Example 8 was evaluated in the same manner as in Example 1. The results are shown in Table 1.

In addition, a lithium-ion rechargeable battery of Example 8 was produced in the same manner as in Example 1 except for the fact that the electrode material for a lithium-ion rechargeable battery of Example 8 was used.

The lithium-ion rechargeable battery of Example 8 was evaluated in the same manner as in Example 1. The results are shown in Table 1.

Comparative Example 1

An aqueous solution of polyvinyl alcohol that had been adjusted to be 10% by mass in advance was mixed with a slurry that had undergone a dispersion treatment for which a sand mill had been used in an amount of 5% by mass of the electrode active material particles in terms of the solid content of polyvinyl alcohol. Except for what has been described above, an electrode material for a lithium-ion rechargeable battery of Comparative Example 1 was produced in the same manner as in Example 1.

The electrode material for a lithium-ion rechargeable battery of Comparative Example 1 was evaluated in the same manner as in Example 1. The results are shown in Table 1.

In addition, a lithium-ion rechargeable battery of Comparative Example 1 was produced in the same manner as in Example 1 except for the fact that the electrode material for a lithium-ion rechargeable battery of Comparative Example 1 was used.

The lithium-ion rechargeable battery of Comparative Example 1 was evaluated in the same manner as in Example 1. The results are shown in Table 1.

Comparative Example 2

The masses of individual raw materials of lithium acetate ($LiCH_3COO$) as a Li source, iron (II) acetate ($Fe(CH_3COO)_2$) as a Fe source, and orthophosphoric acid ($H_3PO_4$) as a P source were adjusted so as to include 2% by mass of $LiFePO_4$ relative to 98% by mass of water-washed electrode active material particles. Furthermore, the electrode active material particles, other raw materials, and distilled water were mixed together so that the water content rate reached 50% by mass, thereby preparing a suspension slurry for a dispersion treatment for which a sand mill was used. Except for what has been described above, an electrode material for a lithium-ion rechargeable battery of Comparative Example 2 was produced in the same manner as in Comparative Example 1.

The electrode material for a lithium-ion rechargeable battery of Comparative Example 2 was evaluated in the same manner as in Example 1. The results are shown in Table 1.

In addition, a lithium-ion rechargeable battery of Comparative Example 2 was produced in the same manner as in Example 1 except for the fact that the electrode material for a lithium-ion rechargeable battery of Comparative Example 2 was used.

The lithium-ion rechargeable battery of Comparative Example 2 was evaluated in the same manner as in Example 1. The results are shown in Table 1.

Comparative Example 3

An electrode material for a lithium-ion rechargeable battery of Comparative Example 3 was produced in the same manner as in Example 5 except for the fact that an aqueous solution of lactose that had been adjusted to be 10% by mass in advance was mixed with a slurry that had undergone a dispersion treatment for which a sand mill had been used in an amount of 6.5% by mass of the electrode active material particles in terms of the solid content of lactose.

The electrode material for a lithium-ion rechargeable battery of Comparative Example 3 was evaluated in the same manner as in Example 1. The results are shown in Table 1.

In addition, a lithium-ion rechargeable battery of Comparative Example 3 was produced in the same manner as in Example 1 except for the fact that the electrode material for a lithium-ion rechargeable battery of Comparative Example 3 was used.

The lithium-ion rechargeable battery of Comparative Example 3 was evaluated in the same manner as in Example 1. The results are shown in Table 1.

Comparative Example 4

An electrode material for a lithium-ion rechargeable battery of Comparative Example 4 was produced in the same manner as in Example 8 except for the fact that an aqueous solution of lactose that had been adjusted to be 10% by mass in advance was mixed with a slurry that had undergone a dispersion treatment for which a sand mill had been used in an amount of 6.5% by mass of the electrode active material particles in terms of the solid content of lactose.

The electrode material for a lithium-ion rechargeable battery of Comparative Example 4 was evaluated in the same manner as in Example 1. The results are shown in Table 1.

In addition, a lithium-ion rechargeable battery of Comparative Example 4 was produced in the same manner as in Example 1 except for the fact that the electrode material for a lithium-ion rechargeable battery of Comparative Example 4 was used.

The lithium-ion rechargeable battery of Comparative Example 4 was evaluated in the same manner as in Example 1. The results are shown in Table 1.

Comparative Example 5

An aqueous solution of polyvinyl alcohol that had been adjusted to be 10% by mass in advance was mixed with a slurry that had undergone a dispersion treatment for which a sand mill had been used in an amount of 5% by mass of the electrode active material particles in terms of the solid content of polyvinyl alcohol, and a dried substance of electrode material particles was thermally treated at 600° C. for one hour in an inert atmosphere. Except for what has been described above, an electrode material for a lithium-ion rechargeable battery of Comparative Example 5 was produced in the same manner as in Example 8.

The electrode material for a lithium-ion rechargeable battery of Comparative Example 5 was evaluated in the same manner as in Example 1. The results are shown in Table 1.

In addition, a lithium-ion rechargeable battery of Comparative Example 5 was produced in the same manner as in Example 1 except for the fact that the electrode material for a lithium-ion rechargeable battery of Comparative Example 5 was used.

The lithium-ion rechargeable battery of Comparative Example 5 was evaluated in the same manner as in Example 1. The results are shown in Table 1.

Comparative Example 6

Lithium phosphate ($Li_3PO_4$) as a Li source and a P source and manganese (II) sulfate ($MnSO_4$) as a Mn source were mixed together so that the molar ratio therebetween reached Li:Mn:P=3:1:1 and, furthermore, distilled water for adjustment was mixed therewith, thereby preparing 600 ml of a raw material slurry.

Next, this raw material slurry was put into a pressure-resistant airtight container, was hydrothermally synthesized at 180° C. for two hours, and then was cooled to room temperature (25° C.), thereby obtaining cake-form electrode active material particles precipitated in the container.

These electrode active material particles were sufficiently washed with distilled water a plurality of times, and then the masses of individual raw materials of lithium acetate ($LiCH_3COO$) as a Li source, iron (II) acetate ($Fe(CH_3COO)_2$) as a Fe source, and orthophosphoric acid ($H_3PO_4$) as a P source were adjusted so as to include 5% by mass of $LiFePO_4$ with respect to 95% by mass of the electrode active material particles. The electrode active material particles, other raw materials, and distilled water were mixed together so that the water content rate reached 50% by mass, thereby preparing a suspension slurry. Except for what has been described above, an electrode material for a lithium-ion rechargeable battery of Example 6 was produced in the same manner as in Comparative Example 1.

The electrode material for a lithium-ion rechargeable battery of Comparative Example 6 was evaluated in the same manner as in Example 1. The results are shown in Table 1.

In addition, a lithium-ion rechargeable battery of Comparative Example 6 was produced in the same manner as in Example 1 except for the fact that the electrode material for a lithium-ion rechargeable battery of Comparative Example 6 was used.

The lithium-ion rechargeable battery of Comparative Example 6 was evaluated in the same manner as in Example 1. The results are shown in Table 1.

TABLE 1

| | Composition | Purity of carbon in organic compound [%] | Carbonization catalyst layer | Specific surface area [m²/g] | Amount of carbon [wt %] | Amount of carbon/specific surface area (A/B) | Moisture amount [ppm] | Saturated adsorbed moisture amount of carbonaceous film single body [ppm] | Initial capacity [mAh/g] | Load characteristics (discharge capacity ratio) [%] | Cycle characteristics (capacity retention) [%] |
|---|---|---|---|---|---|---|---|---|---|---|---|
| Example 1 | $LiFe_{0.3}Mn_{0.7}PO_4$ | 76 | Absent | 9.4 | 0.97 | 0.10 | 1930 | 14320 | 154 | 93.8 | 94.0 |
| Example 2 | $LiFe_{0.15}Mn_{0.85}PO_4$ | 61 | Absent | 13.4 | 1.20 | 0.09 | 3440 | 39880 | 153 | 92.8 | 85.4 |
| Example 3 | $LiFe_{0.17}Mn_{0.83}PO_4$ | 66 | Present | 13.3 | 1.90 | 0.14 | 3800 | 32200 | 146 | 80.1 | 90.2 |
| Example 4 | $LiFe_{0.29}Mn_{0.7}Mg_{0.01}PO_4$ | 66 | Absent | 13.2 | 0.95 | 0.07 | 3170 | 30490 | 154 | 93.5 | 92.5 |
| Example 5 | $LiFe_{0.25}Mn_{0.7}Mg_{0.05}PO_4$ | 70 | Absent | 13.6 | 1.05 | 0.08 | 3630 | 25730 | 149 | 91.5 | 93.3 |
| Example 6 | $LiFe_{0.29}Mn_{0.7}Zn_{0.01}PO_4$ | 66 | Absent | 12.5 | 1.43 | 0.11 | 3350 | 31260 | 150 | 86.0 | 92.0 |
| Example 7 | $LiFe_{0.25}Mn_{0.7}Mg_{0.05}PO_4$ | 66 | Present | 14.0 | 1.68 | 0.12 | 3670 | 31970 | 148 | 90.7 | 93.5 |
| Example 8 | $LiFe_{0.24}Mn_{0.7}Mg_{0.05}Zn_{0.01}PO_4$ | 66 | Absent | 13.4 | 1.00 | 0.07 | 3590 | 33920 | 147 | 92.3 | 89.7 |
| Comparative Example 1 | $LiFe_{0.3}Mn_{0.7}PO_4$ | 55 | Absent | 12.8 | 1.69 | 0.13 | 4820 | 59880 | 151 | 83.6 | 64.3 |
| Comparative Example 2 | $LiFe_{0.32}Mn_{0.68}PO_4$ | 55 | Present | 14.4 | 2.29 | 0.16 | 5590 | 69320 | 146 | 77.1 | 59.2 |
| Comparative Example 3 | $LiFe_{0.25}Mn_{0.7}Mg_{0.05}PO_4$ | 42 | Absent | 13.6 | 1.81 | 0.13 | 5080 | 64860 | 148 | 79.7 | 62.3 |
| Comparative Example 4 | $LiFe_{0.24}Mn_{0.7}Mg_{0.05}Zn_{0.01}PO_4$ | 42 | Absent | 13.8 | 1.86 | 0.13 | 5300 | 66000 | 147 | 79.1 | 62.1 |
| Comparative Example 5 | $LiFe_{0.24}Mn_{0.7}Mg_{0.05}Zn_{0.01}PO_4$ | 55 | Absent | 16.3 | 1.95 | 0.12 | 4710 | 58070 | 150 | 88.3 | 70.1 |
| Comparative Example 6 | $LiFe_{0.05}Mn_{0.95}PO_4$ | 55 | Absent | 35.2 | 3.83 | 0.11 | 6340 | 56450 | 148 | 92.5 | 76.5 |

From the results in Table 1, it could be confirmed that, when Examples 1 to 8 and Comparative Examples 1 to 6 were compared with each other, in the electrode materials for a lithium-ion rechargeable battery of Examples 1 to 8, the specific surface areas were 9.4 m²/g or more and 14.0 m²/g or less, the amounts of carbon were 0.95% by mass or more and 1.90% by mass or less, the ratios of the amount of carbon to the specific surface area of the electrode material for a lithium-ion rechargeable battery ([the amount of carbon]/[the specific surface area of the electrode material for a lithium-ion rechargeable battery]) were 0.07 or more and 0.14 or less, and the saturated adsorbed moisture amounts of the carbonaceous film single body were 14320 ppm or more and 39880 ppm or less.

On the other hand, in the electrode materials for a lithium-ion rechargeable battery of Comparative Examples 1 to 6, it could be confirmed that the specific surface areas were 12.8 m²/g or more and 35.2 m²/g or less, the amounts of carbon were 1.69% by mass or more and 3.83% by mass or less, the ratios of the amount of carbon to the specific surface area of the electrode material for a lithium-ion rechargeable battery ([the amount of carbon]/[the specific surface area of the electrode material for a lithium-ion rechargeable battery]) were 0.11 or more and 0.16 or less, and the saturated adsorbed moisture amounts of the carbonaceous film single body were 56450 ppm or more and 69320 ppm or less.

In addition, in the lithium-ion rechargeable batteries of Examples 1 to 8, it could be confirmed that the initial discharge capacities were 146 mAh/g or more and 154 mAh/g or less, the load characteristics were 80.1% or more and 93.8% or less, and the cycle characteristics were 85.4% or more and 94.0% or less.

On the other hand, in the lithium-ion rechargeable batteries of Comparative Examples 1 to 6, it could be confirmed that the initial discharge capacities were 146 mAh/g or more and 151 mAh/g or less, the load characteristics were 77.1% or more and 92.5% or less, and the cycle characteristics were 59.2% or more and 76.5% or less.

INDUSTRIAL APPLICABILITY

In the electrode material for a lithium-ion rechargeable battery of the present invention, when the saturated adsorbed moisture amount in the carbonaceous film single body coating the surface of the electrode active material is set in a predetermined range, it is possible to improve the durability and stability of a lithium-ion rechargeable battery, and furthermore, when the ratio between the amount of carbon and the specific surface area is set in a predetermined range, it is possible to improve the battery characteristics of a lithium-ion rechargeable battery. Therefore, a lithium-ion rechargeable battery including an electrode for a lithium-ion rechargeable battery produced using the electrode material for a lithium-ion rechargeable battery has excellent cycle characteristics, and thus the lithium-ion rechargeable battery can also be applied to a next-generation secondary battery expected to have higher voltage, higher energy density, higher load characteristics, and higher-speed charge and discharge characteristics, and in the case of a next-generation secondary battery, the effect is extremely great.

The invention claimed is:

1. A cathode material for a lithium-ion rechargeable battery, characterized in that:
    a surface of an electrode active material represented by General Formula $Li_xA_yD_zPO_4$ (A represents at least one element selected from Co, Mn, Ni, Fe, Cu, and Cr, D represents at least one element selected from Mg, Ca, Sr, Ba, Ti, Zn, B, Al, Ga, In, Si, Ge, Sc, and Y, $1 \leq x \leq 1.1$, $0 < y \leq 1$, $0 \leq z < 1$, $0.9 < y+z \leq 1$) is coated with a carbonaceous film made of pyrolytic carbon, derived from an organic compound having 60% or more purity of carbon, and
    a saturated adsorbed moisture amount in a single body of the carbonaceous film, which is detected in a temperature range of room temperature or more and 250° C. or less by means of Karl Fischer (coulometric titration), is 10000 ppm or more and 40000 ppm or less.

2. The cathode material for a lithium-ion rechargeable battery according to claim 1,
    wherein a ratio of a 0.1 C discharge capacity to a 3 C discharge capacity measured at 25° C. is 80% or more.

3. The cathode material for a lithium-ion rechargeable battery according to claim 1,
    wherein, when an amount of carbon is represented by A (mass by mass), and a specific surface area is represented by B (m²/g), A and B satisfy $0.07 \leq A/B \leq 0.15$.

4. A cathode for a lithium-ion rechargeable battery comprising:
    a current collector; and
    an electrode mixture layer formed on the current collector,
    wherein the electrode mixture layer includes the cathode material for a lithium-ion rechargeable battery according to claim 1.

5. A lithium-ion rechargeable battery comprising:
    the cathode for a lithium-ion rechargeable battery according to claim 4.

6. The cathode material for a lithium-ion rechargeable battery according to claim 1, wherein the carbonaceous film has a thickness of 1 to 12 nm.

7. The cathode material for a lithium-ion rechargeable battery according to claim 1, wherein the amount of carbon included in the cathode material is 0.5% by mass or more and 5.0% by mass or less.

8. The cathode material for a lithium-ion rechargeable battery according 1, wherein the amount of carbon included in the cathode material is 0.8% by mass or more and 2.5% by mass or less.

9. The cathode material for a lithium-ion rechargeable battery according to claim 1, wherein the average primary particle diameter of primary particles of the electrode active material made of $Li_xA_yD_zPO_4$ is preferably 50 nm or more and 400 nm or less.

10. The cathode material for a lithium-ion rechargeable battery according to claim 3, wherein A and B satisfy $0.08 \leq A/B \leq 0.13$.

11. The cathode material for a lithium-ion rechargeable battery according to claim 1, wherein the specific surface area of the cathode material is 6 m²/g or more and 25 m²/g or less.

12. The cathode material for a lithium-ion rechargeable battery according to claim 11, wherein the specific surface area of the cathode material is 8 m²/g or more and 20 m²/g or less.

13. The cathode material for a lithium-ion rechargeable battery according to claim 1, wherein the average primary particle diameter of primary particles of the electrode active material made of $Li_xA_yD_zPO_4$ is preferably 50 nm or more and 260 nm or less, and
    the average particle diameter of the cathode material is preferably 75 nm or more and 270 nm or less.

14. The cathode material for a lithium-ion rechargeable battery according to claim 1, wherein the cathode material is manufactured by the method comprising:
    preparing a raw material slurry which is obtained by mixing an electrode active material or precursor of the electrode active material, an organic compound having 60% or more of purity of carbon and a solvent including water; and
    spraying and drying the slurry at a temperature of 70° C. or more and 250° C. or less to generate a granulated body.

15. The cathode material for a lithium-ion rechargeable battery according to claim 1, wherein the steps of spraying and drying are performed in an inert atmosphere or a reducing atmosphere.

* * * * *